(12) United States Patent
Adams et al.

(10) Patent No.: US 7,080,053 B2
(45) Date of Patent: Jul. 18, 2006

(54) NEURAL NETWORK DEVICE FOR EVOLVING APPROPRIATE CONNECTIONS

(75) Inventors: Paul Adams, Stony Brook, NY (US); Kingsley J. A. Cox, Stony Brook, NY (US); John D. Pinezich, East Northport, NY (US)

(73) Assignee: Research Foundation of State University of New York, Stony Brook, NY (US)

( * ) Notice: Subject to any disclaimer, the term of this patent is extended or adjusted under 35 U.S.C. 154(b) by 604 days.

(21) Appl. No.: 10/333,667

(22) PCT Filed: Aug. 16, 2001

(86) PCT No.: PCT/US01/25616

§ 371 (c)(1),
(2), (4) Date: Jan. 21, 2003

(87) PCT Pub. No.: WO02/15125

PCT Pub. Date: Feb. 21, 2002

(65) Prior Publication Data

US 2004/0128004 A1    Jul. 1, 2004

Related U.S. Application Data

(60) Provisional application No. 60/225,581, filed on Aug. 16, 2000.

(51) Int. Cl.
*G06N 3/04* (2006.01)
*G06N 3/06* (2006.01)
(52) U.S. Cl. .............. 706/25; 706/14; 706/39
(58) Field of Classification Search .................. 706/25, 706/14, 39
See application file for complete search history.

(56) References Cited

U.S. PATENT DOCUMENTS

| | | | | |
|---|---|---|---|---|
| 5,452,402 A | * | 9/1995 | Sakiyama et al. | 706/31 |
| 5,588,091 A | * | 12/1996 | Alkon et al. | 706/31 |
| 5,627,942 A | * | 5/1997 | Nightingale et al. | 706/25 |
| 5,636,326 A | * | 6/1997 | Stork et al. | 706/25 |
| 5,649,067 A | * | 7/1997 | Gentric et al. | 706/25 |
| 5,751,915 A | * | 5/1998 | Werbos | 706/4 |
| 6,311,172 B1 | * | 10/2001 | Tresp et al. | 706/20 |
| 6,424,961 B1 | * | 7/2002 | Ayala | 706/25 |

OTHER PUBLICATIONS

Karin E.D., "A Simple Procedure for Pruning Back-Propagation Trained Neural Networks", IEEE Transactions on Neural Networks. vol. 1, No. 2, Jun. 1, 1990. pp. 239-242.

(Continued)

*Primary Examiner*—Anthony Knight
*Assistant Examiner*—Sergey Datskovskiy
(74) *Attorney, Agent, or Firm*—F. Chau & Associates, LLC

(57) ABSTRACT

A method for evolving appropriate connections among units in a neural network includes a) calculating weight changes at each existing connection and incipient connections between units for each training example; and b) determining a K ratio using the weight changes, wherein said K ratio comprises the weight change of existing connections, and wherein if the K ratio the weight change of incipient connections exceeds a threshold, further including b1) increasing a weight of the existing connection; b2) creating new connections at the incipient connections. The method further includes c) pruning weak connections between the units.

16 Claims, 4 Drawing Sheets

OTHER PUBLICATIONS

Khorasani, et al., "Structure Adaptation in Feed-Forward Neural Networks", Neural Networks, 1994. IEEE World Congress on Computational Intelligence. 1994 IEEE International Conference on Orlando. FL USA Jun. 27-Jul. 2, 1994. New York, NY. pp. 1403-1408.

Russell Reed, "Pruning Algorithms—A Survey", IEEE Transactions on Neural Networks, vol. 4, No. 5, Sep. 1, 1993 pp. 740-747.

Ji et al., "Network Synthesis through Data-Driven Growth and Decay", Neural Networks. vol. 10, No. 6. Aug. 1, 1997, pp. 1133-1141.

Yasui et al., "Convergence Suppression and Divergence Facilitation: New Approach to Prune Hidden Layer and Weights of Feedforward Neural Networks", 1995 IEEE International Symposium on Circuits and Systems (ISCAS), Seattle, WA, Apr. 30-May 3, 1995, New York IEEE, US vol. 1, Apr. 30, 1995, pp. 121-124.

* cited by examiner

NEURAL NETWORK DEVICE FOR EVOLVING APPROPRIATE CONNECTIONS The present application claims priority from U.S. Provisional Application Ser. No. 60/225,581 entitled "Device for Creating New Connections in Sparse Neural Networks" filed on Aug. 16, 2000.

The U.S. Government has a paid-up license in this invention and the right in limited circumstances to require the patent owner to license others on reasonable terms as provided for by the terms of contract number to be determined.

BACKGROUND OF THE INVENTION

I. Technical Field

The present invention relates generally to computer processing and more specifically, to a system and method for evolving appropriate connections in sparse neural networks.

II. Description of the Related Art

A neural network is a system composed of many simple processing elements operating in parallel which has a natural propensity for storing experiential knowledge and making it available for use. It resembles the brain in two respects: 1) knowledge is acquired by the network through a learning process, and 2) interneuron connection strengths known as synaptic weights are used to store the knowledge.

Neural network devices (NNDs) are used to process information using neuron-like units connected by variable strength "synapses". These devices can be realized in either hardware or software, and they perform massively parallel computations that are useful in pattern recognition, finance and a host of other applications. The computations performed by the devices are determined by the strengths of the connections, which constitute the computational "program". There are various procedures for setting the strengths of the connections, mostly variants of the so-called "Hebbian" rule, a type of feedforward neural network in which the connection strengths are determined in a training phase by the past history of activity of both input and output neurons. The most well known variant is "backpropagation". The backpropagation algorithm compares an output (result) that was obtained with the result that was expected. It then uses this information to systematically modify the weights throughout the neural network to better predict future outputs.

Typically, existing neural network systems have an architecture that is fully connected; that is, all its computing units are in contact (fully connected) with each other. This necessitates the examination of activity across each connection, which, due to the potentially vast number of connections in fully connected architectures, is a formidable task. Thus, current neural network technologies (either in hardware or software) suffer from overfitting and often require excessive computational resources or expert architectural specification. Although some existing neural networks do use limited connectivity, they usually involve a fixed architecture, in which there are a small number of connections that do not change and thus lack adaptive ability. In addition, to limit the number of connections, some previous approaches have either involved simply pruning away weak connections, or using separate evolutionary algorithms to find suitably sparsely-connected NNDs that can then be programmed by conventional activity-dependent methods.

Accordingly, an efficient and accurate technique for training neural networks which both simplifies the task of setting connection strengths and allows new connections to be created as training proceeds, is highly desirable.

SUMMARY OF THE INVENTION

The present invention is directed towards a system and method for efficiently evolving new connections in a neural network. In a neural network device according to the present invention, new connections are created in the neighborhood of existing connections by adding a "mutational" component to whatever synaptic strengthening rule is used in a conventional neural network device. This allows a combination of the advantages of fully connected networks and of sparse networks. Next, to minimize problems (e.g., diffuseness of connections) introduced by this novel "mutational" feature, weight adjustment is only allowed to occur across connections if monitoring "K" units decree that unnecessary spread of connections is unlikely to occur.

In one aspect of the present invention, a method for evolving appropriate connections among units in a neural network is provided comprising the steps of calculating weight changes at each existing connection and incipient connections between units for each training example; determining a K ratio using the weight changes, wherein if the K ratio exceeds a threshold, further comprising the steps of: increasing a weight of the existing connection; creating new connections at the incipient connections; and pruning weak connections between the units.

These and other aspects, features, and advantages of the present invention will be described or become apparent from the following detailed description of the preferred embodiments, which is to be read in connection with the accompanying drawings.

DESCRIPTION OF PREFERRED EMBODIMENTS

It is to be understood that the exemplary system modules and method steps described herein may be implemented in various forms of hardware, software, firmware, special purpose processors, or a combination thereof. Preferably, the present invention is implemented in software as an application program tangibly embodied on one or more program storage devices. The application program may be executed by any machine, device or platform comprising suitable architecture. It is to be further understood that, because some of the constituent system modules and method steps depicted in this specification are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

In the present invention, a system and method is provided for creating new connections in feedforward topological networks (i.e., networks where the units or "neuroids" have spatial relationships) comprising two steps: 1) a procedure for creating new connections, and 2) a spatialised third layer of units called K units or "nousoids" which are used to control connection adjustment. Such a process is applied to neural networks having computing units that are not fully connected; thus, only a small fraction of the total number of possible connections actually exists at one time. This greatly reduces the number of calculations that must be done, since only the calculations corresponding to the existing connections need be determined. Limited connectivity networks require fewer computations than fully connected networks, and often perform better. The network weights are preferably digitized, so weight adjustments (which can be done according to any standard procedure, such as back-propagation, Hebbian learning, etc.) correspond to the addition (or removal) of "synapses" to a connection. A variable "learning rate factor" (typically 1 or 0) is preferably associated with each connection, and input/output pairs of neuroids that are not linked by synapses are "unconnected".

Figure 1:
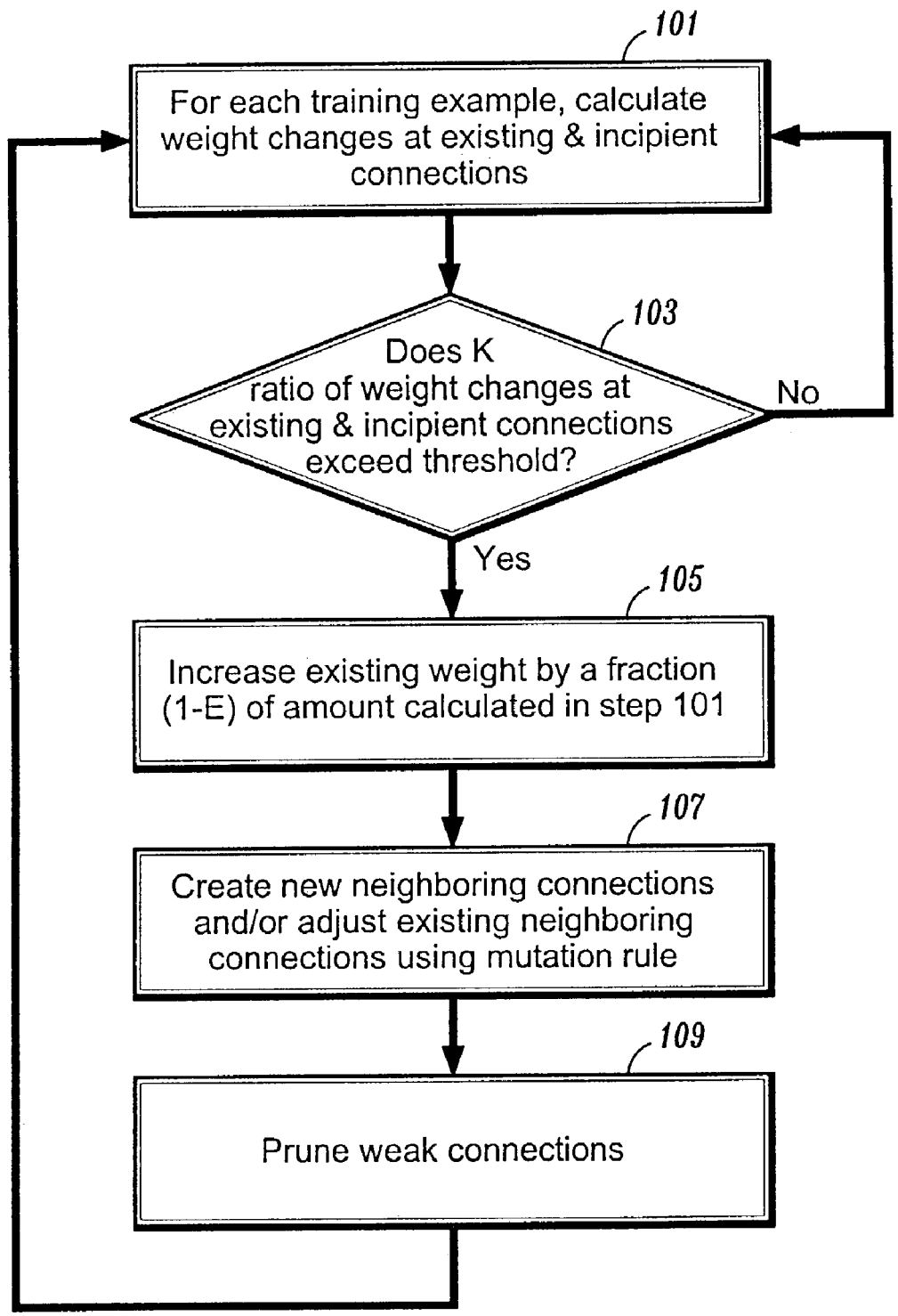
FIG. 1 illustrates an exemplary flow diagram of a method for evolving appropriate connections in a neural network device according to an aspect of the present invention.

FIG. 1 illustrates an exemplary flow diagram of a method for evolving appropriate connections in a neural network device according to an aspect of the present invention.

Initially, weight changes induced by each particular training sample or pattern are calculated using, for example, a conventional network training rule such as Hebb or back-propagation (step 101). These weight changes are calculated for all existing connections and also for "incipient" connections (connections adjacent to the existing connection which are yet-to-be-formed depending on a K ratio, which is described below).

Next, a ratio of the weight changes for existing connections to incipient connections ("K" ratio) is calculated in step 103. If this K ratio exceeds a specified threshold, weight changes are implemented in step 105, in which existing weights are increased by (1−E)×(total weight change of existing connections), where E is a network-wide parameter. The parameter E represents an "error" or "mutation" rate.

A system according to the present invention preferably uses a constant value of E, which can be approximately determined, for example, by calculating:

$$\frac{1}{\sqrt{nm}},$$

where n is a number of J cells and m is a number of I cells. (J and I each representing a layer of neurons in a conventional 2 layer feedforward neural network device).

Preferably, a system according to the present invention uses discrete levels of connection strength (0, 1, 2 etc.). Thus, strengthening connections corresponds to adding discrete synapses (weight) to connections. In one aspect of the present invention, a mutation rule is presented in which an amount (1−E)×(total weight of existing connections) is added to an appropriate existing connection (step 105). The remaining amount (E)×(total weight change of existing connections) is added to form neighboring connections (step 107). It is to be noted that if neighboring connections are not yet in existence (i.e, they are incipient connections), they can be created by this mutation rule; however, whether such hew connections are created depends on the size of the weight increase computed in step 101, together with the magnitude of E.

After cycling through a training set, connections that are weak (e.g., weaker than a specified threshold) are deleted (step 109). This threshold corresponds, for example, to the strength of a single discrete weight level (a single synapse). A 0-strength connection does not exist, and thus the calculation of modifications of such non-existent connections are completely avoided. Since in conventional NNDs composed of very large numbers of neurons most of the connections are very weak, in a system according to the present invention, most of the connections will be eliminated through pruning, thus greatly reducing the number of training calculations, and speeding up the training phase. Thus, the net effect of such mutation and pruning is to import the Darwinian evolutionary principle directly into the activity-dependent learning phase, rather than as a prior step used to set a fixed network architecture. Following step 109, the system returns to step 101.

The overall effect of the addition of the mutation rule is that during the training of the device, although only a small fraction of the possible connections is available at any time (greatly decreasing the calculations that have to be done to train the device), new connections are constantly being recruited and unimportant connections eliminated, so that the final small set of connections is close to the optimum small set for the particular problem at hand. If the problem should change (for example, if new training examples become available), the set of connections can be further modified.

Advantageously, a system according to the present invention includes the possibility of automatically forming new connections so that although at any one time there are only a small number of connections, there is the capability to form new connections and eliminate old or faulty ones; thus, the network constantly evolves and improves itself.

The new connections are preferably formed randomly in the vicinity of the existing connections, and are tested to evaluate if they are "good" or "bad", which can be determined, for example, by the conventional network training rule used. Preferably, good connections are retained, and bad ones are eliminated and/or replaced by good ones. Thus, the connections are shifted continuously until a best possible set of connections is found.

The exemplary process described above can be applied to any neural network in which there exists some natural relationship between the elements of the input (as in the postsynaptic case of FIG. 3) or output (as in the presynaptic case of FIG. 2) patterns or vectors. Such is often the case in problems to which neural networks are applied, such as pattern recognition. However, when using such a technique to make new connections in the vicinity of existing ones, a problem might arise wherein the new connections may propagate uncontrollably. This would be problematic since new connections could be potentially harmful; in addition, an overabundance of new connections would defeat the purpose of the present invention as having only a small number of connections to deal with at any particular time.

To solve this problem, the creation/strengthening of neighboring connections is monitored using third layer (K) of neuron-like units (which perform steps 101 and 103). This process is further explained in FIGS. 2 and 3 below.

Figure 2:
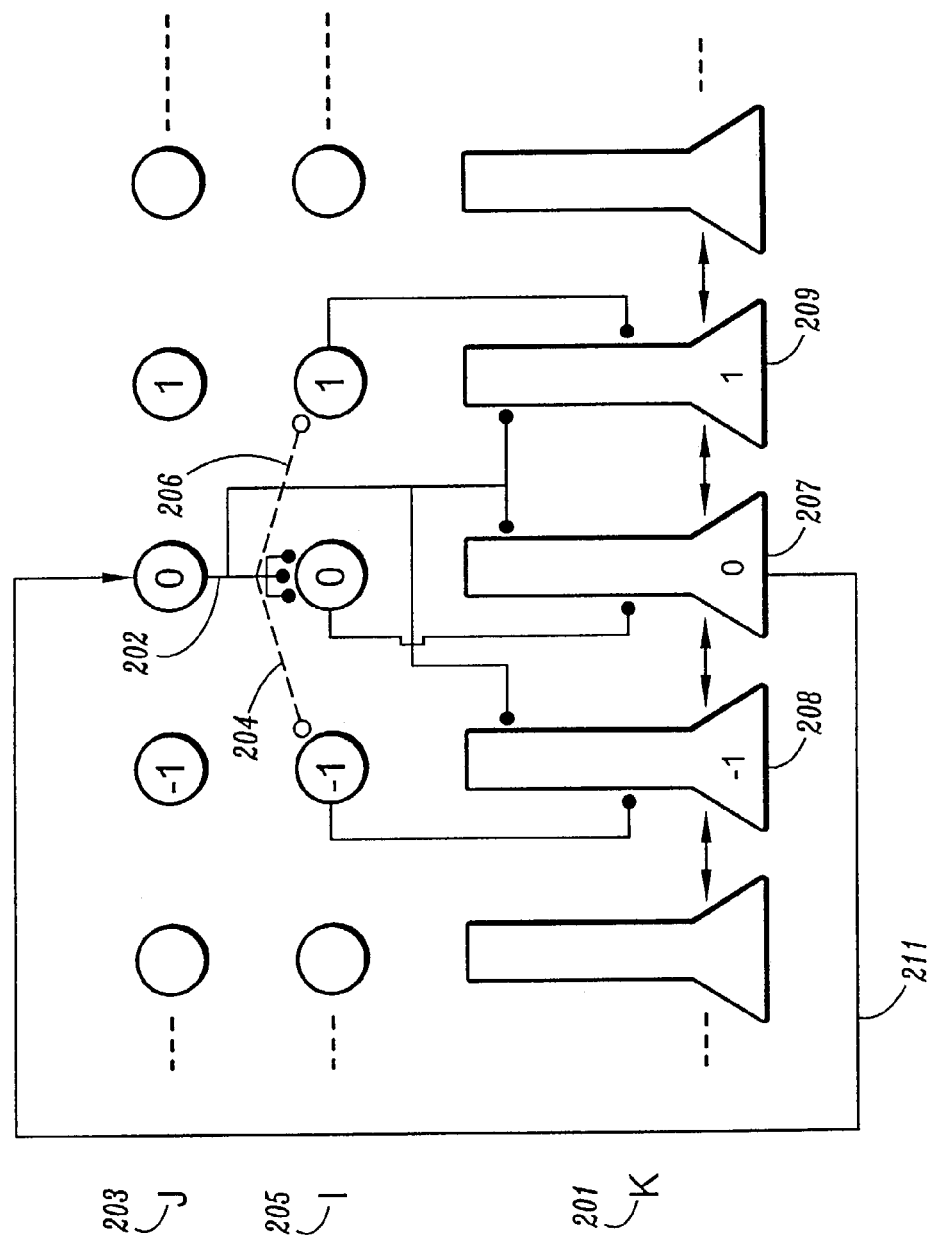
FIG. 2 depicts an exemplary presynaptic relationship neighborhood illustrating a preferred circuitry for monitoring weight adjustment of connections according to an aspect of the present invention.

FIG. 2 depicts an exemplary presynaptic relationship neighborhood illustrating a preferred circuitry for monitoring weight adjustment of connections according to an aspect of the present invention. Each cell in an input (J) layer 203 and output (I) layer 205 comprises a standard connectionist unit which computes a weighted sum of its input (input units can in turn receive inputs from other input units, not shown, these inputs could be treated a conventional NND or as a neural network according to the present invention).

For illustrative purposes, only one connection 202 from cell 0 in the input J layer (203) to cell 0 in the output I layer (205), is shown in FIG. 2, but it should be noted that the method of the present invention can be applied to any practical device where there are potentially m×m connections (where n is the number of J cells and m is the number of I cells). J units provide inputs to I units via discrete synaptic weights shown for example, as small black dots. If an existing connection strengthens during network training as a result of the activity across it (e.g. strengthening of the ($J_0$ to $I_0$) connection 202), the added discrete increments of synaptic strength may appear, for example, at the existing connection in the amount of (1−E)×(total weight change of existing connections) or at the incipient connections (shown as small open circles and dashed lines) in the amount of (E)×(total weight change of existing connections). The added synaptic strength for each neighboring connection (neighboring connections are adjacent to the existing connection) would be in the amount of (E/2)×(total weight change of existing connections).

Here, the strength of the connection 202 is, for example, 3 units (represented as the 3 black dots). Neighbors of the ($J_0$ to $I_0$) connection are shown as connections ($J_0$ to $I_{-1}$)(204) and ($J_0$ to $I_1$)(206). These are incipient connections (in the sense that by the mutation rule these connections 204 and 206 may be formed if the existing connection 202 strengthens) and are shown as dotted lines and open dots. It is to be noted that if new connections are formed as a result of this mutational rule during training, they themselves undergo adjustment (including possible elimination) during further training.

If the total synaptic strength (measured in discrete steps) of a J unit is constrained to be much less than the number of postsynaptic units, a neural network according to the present invention is sparsely connected and the number of computer calculations or hardware links needed is much less than for an equivalent NND, thus resulting in increased efficiency in training. However, for certain problems the mutational rule may prevent training if E is too large or too small. Thus, optimal training is assured using an additional chaperone layer, marked K (201).

Figure 3:
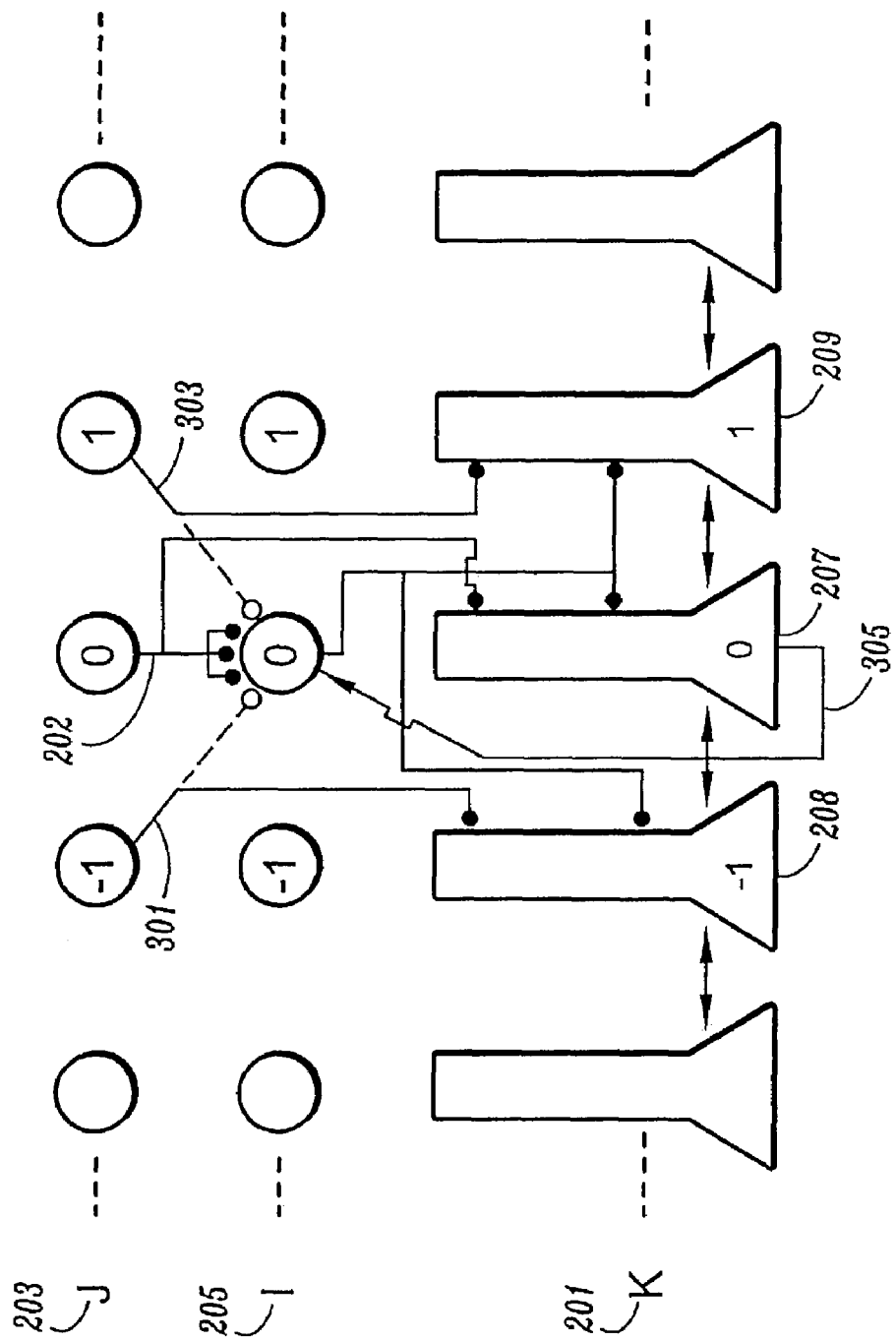
FIG. 3 depicts an exemplary postsynaptic relationship neighborhood illustrating a preferred circuitry for monitoring weight adjustment of connections according to an aspect of the present invention.

Thus, a third layer (K) (201) of neuron-like units is introduced (shown as chimney triangles in FIGS. 2 and 3). This K layer contains 3n or 3m neurons (depending whether a pre- or postsynaptic neighborhood rule is used). It is to be noted that in problems in which the natural neighborhood relations between input or output variables is 2 rather than 1 dimensional, larger numbers of K neurons would be needed. In FIGS. 2 and 3, only 3 of these K layer units are shown for illustrative purposes. (If the connections made or received by a J or I layer neuron involve more than one partner, a central K cell monitors the average of the activity across all the relevant J or I layer neurons).

Thus, in a preferred embodiment, the separate, spatialised third layer (K) of units (201) called "nousoids" is added to the input layer J (203) and the output layer 1 (205). For each existing feedforward connection, a dedicated "center" nousoid or K cell 207 receives input from both the input 203 and output 205 neuroids contributing to that connection. The center K cell 207 computes whatever quantity determines the updating of the feedforward connection (it therefore receives all signals used to calculate that update).

Neighboring "surround" nousoids 208 and 209 of the center K cell 207 receive and compute a similar quantity for the pairs of unconnected neuroids that immediately surround the connected neuroids. That is, each K unit computes products of its J unit inputs (shown in FIGS. 2 and 3 as the inputs to the tops of the chimneys) and their I unit inputs (shown in FIGS. 2 and 3 on the bases of the chimneys). The central K unit 207 computes this product for the units contributing to the existing connection (which may include more than the one I cell shown). Flanking K units 208 and 209 compute this product for incipient connections (it is to be noted that for certain problems there may be more than the 2 flanking K units shown here).

Thus, the central K cell 207 monitors the activity across the existing connections formed by each J or I unit, and the 2 flanking K cells 208 and 209 monitor the activity across each of the corresponding incipient connections. Interaction between center K cell 207 and flanking K cells 208 and 209 allows the computation of an "update K ratio" which is then used by the center K cell 207 to control the learning rate factor at the connection corresponding to the center K cell. This update ratio ("K" ratio) is calculated by the center K cell 207 by computing a ratio of its own input products to the input products of its flanking K units 208 and 209. For example, this can be done by dividing the amount by which an existing connection strengthens (i.e., its weight change) by the amount by which the incipient connections strengthens. That is:

$$K \text{ ratio} = \text{weight change of existing connections} / \text{weight change of incipient connections}$$

The central K cell 207 computes the ratio of the existing to incipient activities, and if this ratio exceeds some threshold T (which depends on E), it sends a signal 211 to the relevant J cell (here, cell $J_0$) making the connection. This signal 211 allows activity-dependent connection adjustment to occur. In the absence of this signal, the activity across the existing connection 202 caused by the training example has no effect on the existing connection 202. It is to be noted that at other connections T may be exceeded and learning (weight adjustment) will thus occur at such connections. Also, connections may gain strength not only from the activity they receive directly, but also from spillover from the strengthening of neighboring connections.

Thus, the K cells 207, 208 and 209 act as "chaperones" for the connections between the input layer J (203) and output layer I (205), since they only allow weight adjustment to occur if it is likely that new connections formed during training will be eliminated. As a result, high E values can be used, thus allowing training to proceed rapidly. The net result of this chaperoning is that the mutational spread of connections during training, which is necessary to find a final nearly optimal set of connections, is never allowed to get out of control. Overall, in FIG. 2, since incipient connections are made onto neighbors of the postsynaptic unit(s) contributing to existing connections, the flanking K units 208 and 209 monitor the conjoint activity (if training is "Hebbian") of unit pairs $J_0$ and $I_{-1}$ or $J_0$ and $I_1$, respectively. More generally, K cells monitor whatever signal causes strengthening of existing or incipient connections (for example, the product of pre- and postsynaptic activites ("Hebb rule"), or the product of presynaptic activity and the difference between postsynaptic activity and a target value ("Delta Rule"), or in backprop a generalized Delta rule).

FIG. 3 depicts an exemplary postsynaptic relationship neighborhood illustrating a preferred circuitry for monitoring weight adjustment of connections according to an aspect of the present invention. Postsynaptic mutation can also be used to convert a NND to a neural network according to the present invention, but this requires a different arrangement of chaperoning K-units. For example, in this postsynaptic case, the neighbors of the ($J_0$ to $I_0$) connection 202 are the connections ($J_{-1}$ to $I_0$)(301) and ($J_1$ to $I_0$)(303). As described in FIG. 2 above, the top 2 rows of circles (row J (203) and row I (205)) represent the neurons of a conventional 2 layer feedforward NND.

It is to be noted that in both the presynaptic and postsynaptic cases the concept of "neighborhood" implies that there is some natural preferred relation between the input or output variables. Such a situation would automatically arise, for example, in a pattern recognition task, where the input variables might be image pixels. Overall, the principle involved is identical to that in FIG. 2. Here, the central K cell 207 monitors the activity across the existing connections formed by each J or I unit, and the 2 flanking K cells 208 and 209 monitor the activity across each of the corresponding incipient connections. Interaction between center K cell 207 and flanking K cells 208 and 209 allows the computation of the update K ratio which is then used by the center K cell 207 to control the learning rate factor at the connection corresponding to the center K cell.

The central K cell 207 computes the ratio of the existing to incipient activities, and if this ratio exceeds some threshold T, it sends a signal 305 to the relevant I cell (here, cell 10) making the connection. This signal 305 allows activity-dependent connection adjustment to occur. Thus, in FIG. 3, since incipient connections are made from neighbors of presynaptic units, the flanking K units 208 and 209 monitor conjoint activity across unit pairs ($J_{-1}$ to $I_0$) and ($J_1$ to $I_0$), respectively.

It is to be noted that both approaches (presynaptic and postsynaptic) to constructing neural network devices according to an aspect of the present invention could be combined in one device, though this would require two different types of K units.

The effect of applying the chaperoning layer K is that weights are only updated if the ensuing possible creation of new connections will not seriously degrade network performance. As the network evolves, it is preferable to update the nousoid connections using a recalibration algorithm to keep pace with the formation of new feedforward connections. This recalibration algorithm is described in "Implications of Synaptic Digitisation and Error for Neocortical Function", Neurocomputing 32–33 (2000) 673–678, authored by Kingsley J. A. Cox and Paul Adams, the disclosure of which is herein incorporated by reference.

Figure 4:
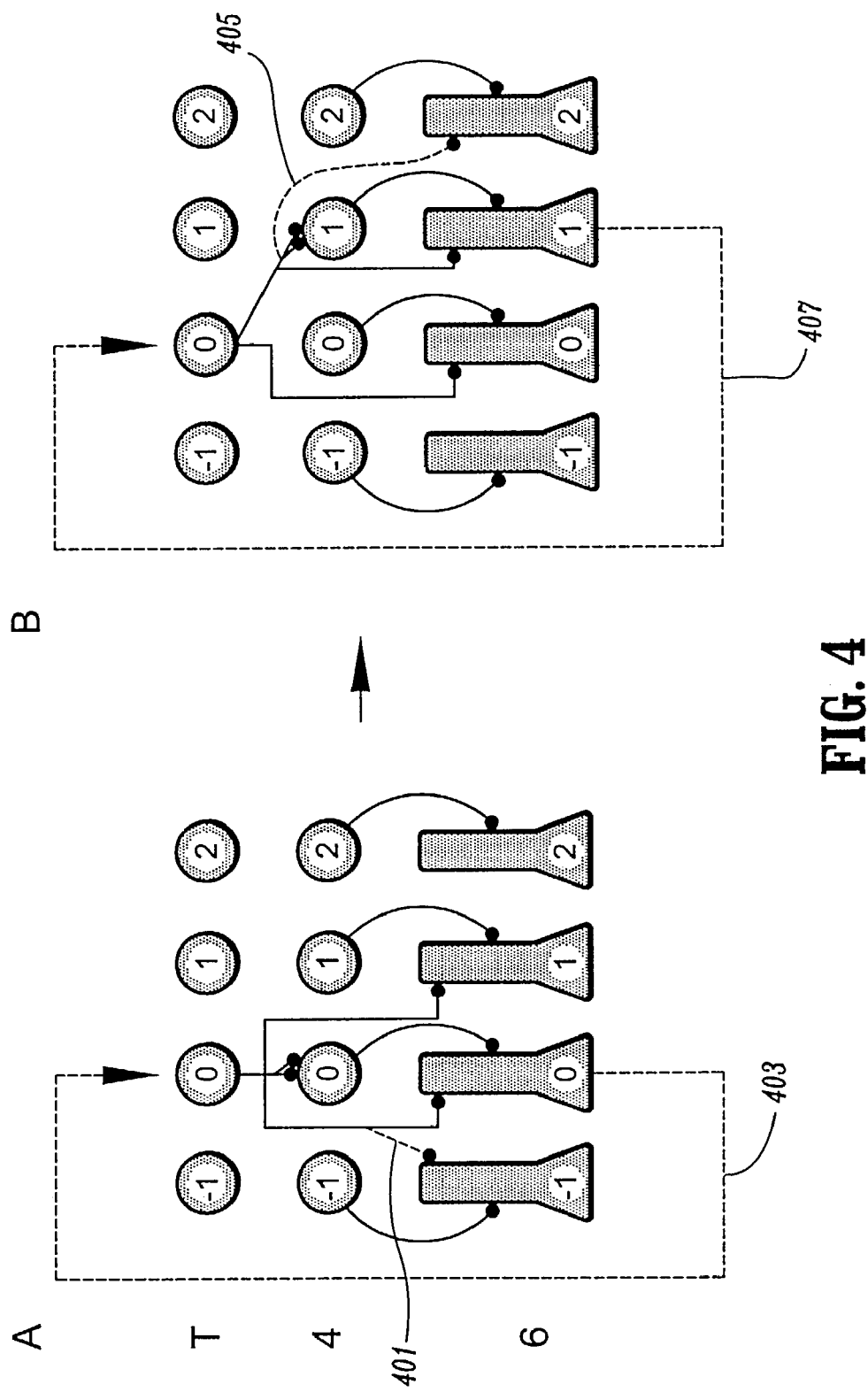
FIG. 4 illustrates an exemplary case where an errant synapse flourishes and a relay cell transfers its allegiance to a neighbor of an original layer 4 cell.

The recalibration algorithm comprises steps which simulate a process which occurs in the brain, for example, FIG. 4 illustrates an exemplary case where, as a result of daytime learning, an errant synapse flourishes and a relay cell transfers its allegiance to a neighbor of the original layer 4 cell (corresponds, for example, to the I cell layer). Before any further plasticity is allowed, the connections of layer 6 cells (which correspond, for example, to the K cells) must be updated, so they can continue to limit error spread. This updating, which involves breaking the dotted connections 401 and 403 and making dashed connections 405 and 407, is preferably done offline, with the feedforward T-4 connections rendered implastic. (Layer T corresponds, for example, to the J cell layer). Layer 4 to layer 6 connections, which define the columns of cortex, are permanent. The connections from layer T to layer 6 can be updated if the T cell fires in bursts, since this will fire the newly connected layer 4 cell, which will fire the correct layer 6 cell. The connection from the new layer 4 cell to its partner layer 6 cell will undergo Hebbian strengthening, and errant synapses will form onto the neighbors of that layer 6 cell, as required. If this bursting activity advances as a calibrating wave across thalamic nuclei, it will automatically update all the T-to-6 connections. Updating the return pathway to thalamus is trickier, because the new layer 6 cell must find all the relay cells that comprise the receptive field of its partner layer 4 cell. Because layer 6 cells act as correlation detectors, they can do reverse correlation analysis to determine this receptive field. White noise must be played into thalamus to perform offline updating of the corticothalamic connections. Now it is preferable that a group of relay cells fire the new layer 4 cell, so the calibrating, white noise input should be in tonic mode. These requirements match the features of slow wave and paradoxical sleep. In the former case, traveling bursts are imposed on thalamus by its reticular nucleus, in the latter, irregularly discharging brainstem cholinergic neurons bombard relay cells with brief nicotinic epsps.

FIG. 4 shows the start and end of the allegiance transfer, but not intermediate points, when the thalamic cell makes synapses on both layer 4 cells, which at the end of the day comprise an extended high-fitness zone. Now it is the average correlation in the high-fitness zone that should be compared to the flanking correlations, and used to control the plasticity of the thalamic neuron. This can be achieved if there is also offline updating of the lateral interactions between neighboring layer 6 cells, so that during the transfer layer 6 cells marked 0 and 1 act as a unit, comparing their average activity to that of the flanking cells (marked −1 and 2) and both feeding back to the relay cell. This (and similar updating in layers 2, 3 and 5) can again be accomplished in slow wave sleep. Because the connections of layer 6 complex-type cells that control postsynaptic plasticity must also be updated offline in a similar manner during sleep, and because the required calibration signals (burst waves and white noise) are generated thalamically, layer 6 control of postsynaptic plasticity must also loop back through thalamus, via matrix relay cells that synapse in layer 1. In this case, white noise input must be played into the postsynaptic cells, presumably by random matrix cell spikes fired into the apical tufts under conditions where apical epsps initiate somatic spikes.

Advantageously, a system and method according to the present invention simplifies the task of setting connection strengths in NNDs by, for example, greatly reducing the set of connections that have to be adjusted.

In a computer simulation of a neural network device according to the present invention, "pointers" can be used to direct the calculations which would only be performed at existing connections. These program pointers are integers which correspond to discrete memory locations. Calculations are preferably controlled by these pointers.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the present invention. All such changes and modifications are intended to be included within the scope of the invention as defined by the appended claims.

What is claimed is:

1. A computer-implemented method for evolving appropriate connections among units in a neural network comprising the steps of:
   a) calculating weight changes at each existing connection and incipient connections between units for each training example;
   b) determining a K ratio using the weight changes, wherein said K ratio comprises $$\frac{\text{the weight change of existing connections}}{\text{the weigh tchange of incipient connections}},$$

and wherein if the K ratio exceeds a threshold, further comprising the steps of:
   b1) increasing a weight of the existing connection;
   b2) creating new connections at the incipient connections; and
   c) pruning weak connections between the units.

2. The computer-implemented method of claim 1, wherein the incipient connections comprises connections adjacent to the existing connection which are yet-to-be-formed depending on the K ratio.

3. The computer-implemented method of claim 1, wherein a parameter E comprises approximately:

$$\frac{1}{\sqrt{nm}},$$

where n is a number of J cells and m is a number of I cells.

4. The computer-implemented method of claim 1, wherein the K ratio is determined for a center cell of the neural network, wherein upon the creation of the new connections at the incipient connections, feedforward connections to the center cell from an input layer of the neural network and an output layer of the neural network are updated.

5. The computer-implemented method of claim 1, wherein if the K ratio does not exceed the threshold, further comprising returning to step (a).

6. The computer-implemented method of claim 1, wherein the weak connections comprise connections having weights below a specified strength.

7. The computer-implemented method of claim 1, wherein the step of increasing the weight of the existing connection further comprises increasing said weight by (1−E)×(total weight change of existing connections).

8. The computer-implemented method of claim 1, wherein the new connections comprise a weight of (E)×(total weight change of existing connections).

9. A program storage device readable by a machine, tangibly embodying a program of instructions executable by the machine to perform the method steps for evolving appropriate connections among units in a neural network, the method steps comprising the steps of:
   a) calculating weight changes at each existing connection and each incipient connection between units for each training example;
   b) determining a K ratio using the weight changes, wherein said K ratio comprises $$\frac{\text{the weight change of existing connections}}{\text{the weight change of incipien tconnections}},$$

and the weight change of incipient connections wherein if the K ratio exceeds a threshold, further comprising the steps of:
   b1) increasing a weight of the existing connection;
   b2) creating new connections at the incipient connections; and
   c) pruning weak connections between the units.

10. The program storage device of claim 9, wherein the incipient connection comprises connections adjacent to the existing connection which are yet-to-be-formed depending on the K ratio.

11. The program storage device of claim 9, wherein a parameter E comprises approximately:

$$\frac{1}{\sqrt{nm}},$$

where n is a number of J cells and m is a number of I cells.

12. The program storage device of claim 9, wherein if the K ratio does not exceed the threshold, further comprising returning to step (a).

13. The program storage device of claim 9, wherein the weak connections comprise connections having weights below a specified strength.

14. The program storage device of claim 9, wherein the step of increasing the weight of the existing connection further comprises increasing said weight by (1−E)×(total weight change of existing connections).

15. The program storage device of claim 9, wherein the new connections comprise a weight of (E)×(total weight change of existing connections).

16. The program storage device of claim 9, wherein the K ratio is determined for a center cell of the neural network, wherein upon the creation of the new connections at the incipient connections, feedforward connections to the center cell from an input layer of the neural network and an output layer of the neural network are updated.

* * * * *